United States Patent
Weber et al.

(10) Patent No.: US 12,256,138 B2
(45) Date of Patent: *Mar. 18, 2025

(54) USER-LINKED FEATURES FOR IMAGE CAPTURE DEVICE

(71) Applicant: GoPro, Inc., San Mateo, CA (US)

(72) Inventors: Clark Weber, Mill Valley, CA (US); Fong Tran, San Mateo, CA (US); Ian Klassen, San Mateo, CA (US); Vadim Polonichko, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,906

(22) Filed: Nov. 24, 2023

(65) Prior Publication Data

US 2024/0089582 A1 Mar. 14, 2024

Related U.S. Application Data

(63) Continuation of application No. 16/949,230, filed on Oct. 21, 2020, now Pat. No. 11,902,652.

(51) Int. Cl.
*H04N 23/617* (2023.01)
*G06F 8/65* (2018.01)
*G06Q 10/10* (2023.01)
*G06Q 20/12* (2012.01)
*G06Q 30/016* (2023.01)

(52) U.S. Cl.
CPC .............. *H04N 23/617* (2023.01); *G06F 8/65* (2013.01); *G06Q 10/10* (2013.01); *G06Q 20/127* (2013.01); *G06Q 30/016* (2013.01)

(58) Field of Classification Search
CPC ...... H04N 23/617; H04N 23/60; G06Q 10/10; G06Q 20/127; G06Q 30/016; G06Q 30/015; G06Q 30/06; G06Q 30/0631; G06F 8/65
See application file for complete search history.

(56) References Cited

U.S. PATENT DOCUMENTS

| | | | |
|---|---|---|---|
| 8,868,796 B1 * | 10/2014 | Wojcik | G06F 8/65 710/5 |
| 11,902,652 B1 * | 2/2024 | Weber | G06Q 30/06 |
| 2006/0026304 A1 * | 2/2006 | Price | G06F 8/65 710/8 |
| 2012/0229655 A1 * | 9/2012 | Solomon | H04N 23/60 348/207.1 |
| 2016/0285636 A1 * | 9/2016 | Davoust | H04L 9/0819 |
| 2020/0044868 A1 * | 2/2020 | Vakulenko | G06F 21/305 |
| 2020/0045163 A1 * | 2/2020 | Hwang | H04M 1/72451 |
| 2020/0409684 A1 * | 12/2020 | Shibukawa | G06F 8/60 |
| 2020/0409685 A1 * | 12/2020 | Shimomoto | G06F 8/654 |

* cited by examiner

*Primary Examiner* — Timothy J Henn
*Assistant Examiner* — John H Morehead, III
(74) *Attorney, Agent, or Firm* — ESPLIN & ASSOCIATES, PC

(57) ABSTRACT

Features to be enabled for an image capture device may be determined based on user subscription to a feature plan and/or user usage of the image capture device. The features for the image capture device may be enabled through firmware update or code unlock.

20 Claims, 5 Drawing Sheets

USER-LINKED FEATURES FOR IMAGE CAPTURE DEVICE

FIELD

This disclosure relates to enabling features of an image capture device based on user of the image capture device.

BACKGROUND

An image capture device may be capable of providing numerous features to capture content. Only a subset of users may fully utilize the features offered by the image capture device. Selectively providing features of the image capture device to users may increase engagement of the users with the image capture device.

SUMMARY

This disclosure relates to enabling image capture features. User information for an image capture device and/or other information may be obtained. One or more features to be enabled for the image capture device may be determined based on the user information and/or other information. The one or more features for the image capture device may be enabled.

A system that enables image capture features may include one or more electronic storage, processor, and/or other components. An electronic storage may store information relating to image capture device, information relating to features of image capture device, user information, information relating to user, information relating to enabling features of image capture device, and/or other information.

The processor(s) may be configured by machine-readable instructions. Executing the machine-readable instructions may cause the processor(s) to facilitate enabling image capture features. The machine-readable instructions may include one or more computer program components. The computer program components may include one or more of a user component, a feature determination component, a feature enablement component, and/or other computer program components.

The user component may be configured to obtain user information for an image capture device and/or other information. In some implementations, the user information may characterize subscription of a user of the image capture device to one or more feature plans. In some implementations, the user information may characterize usage of the image capture device by a user.

The feature determination component may be configured to determine one or more features to be enabled for the image capture device based on the user information and/or other information. In some implementations, the feature(s) to be enabled for the image capture device may include one or more beta features.

In some implementations, the feature(s) to be enabled for the image capture device may be determined based on whether or not the user of the image capture device has a current subscription to the feature plan(s) and/or other information. In some implementations, the feature(s) to be enabled for the image capture device may be determined based the usage of the image capture device by the user and/or other information.

In some implementations, the user of the image capture device may be classified as an advanced user or a basic user based on the usage of the image capture device by the user and/or other information. Responsive to classification of the user as the advanced user, the feature(s) for the image capture device may be offered to the user. Responsive to classification of the user as the basic user, usage of one or more advanced features may be recommended to the user. Usage by the user of the advanced feature(s) may change the classification of the user from the basic user to the advanced user.

The feature enablement component may be configured to enable the feature(s) for the image capture device. In some implementations, the feature(s) for the image capture device may be enabled for a limited amount of time. In some implementations, the feature(s) for the image capture device may be enabled without a time constraint. In some implementations, the feature(s) for the image capture device may be enabled based on user acceptance of the offer of the feature(s) for the image capture device.

In some implementations, the feature(s) for the image capture device may be enabled through firmware update. In some implementations, the feature(s) for the image capture device may be enabled through one or more feature unlock options in firmware of the image capture device.

In some implementations, the firmware update that enables the feature(s) for the image capture device may be provided to the image capture device based on the user of the image capture device having the current subscription to the feature plan(s). The firmware update that enables the feature(s) for the image capture device may not be provided to the image capture device based on the user of the image capture device not having the current subscription to the feature plan(s).

In some implementations, responsive cancellation of the subscription of the user of the image capture device to the feature plan(s), the feature(s) for the image capture device may be disabled through firmware downgrade.

In some implementations, preview of one or more features not enabled for the image capture device may be provided to a user of the image capture device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
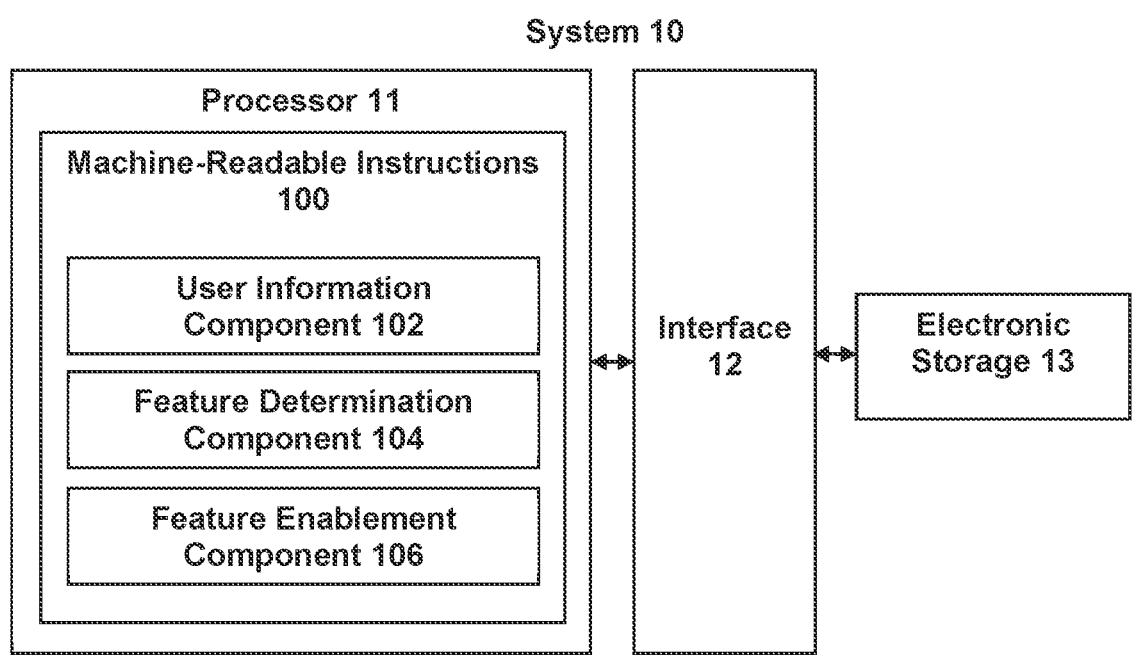
FIG. 1 illustrates an example system that enables image capture features.

FIG. 1 illustrates a system 10 for enabling image capture features. The system 10 may include one or more of a processor 11, an interface 12 (e.g., bus, wireless interface), an electronic storage 13, and/or other components. User information for an image capture device and/or other information may be obtained by the processor 11. One or more features to be enabled for the image capture device may be determined by the processor 11 based on the user information and/or other information. The one or more features for the image capture device may be enabled by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to image capture device, information relating to features of image capture device, user information, information relating to user, information relating to enabling features of image capture device, and/or other information.

Figure 3:
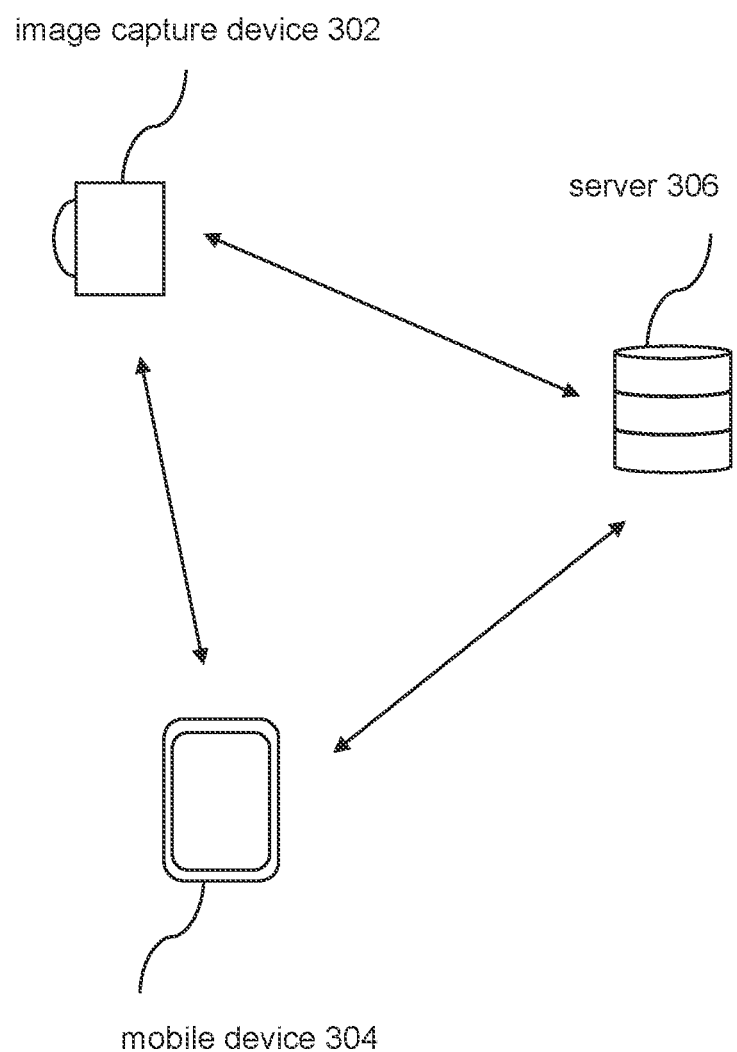
FIG. 3 illustrates example communication between devices for enabling image capture features.

FIG. 3 illustrates example communication between devices for enabling image capture features. One or more features of an image capture device 302 may be enabled based on communication among two or more of the image capture device 302, a mobile device 304, and/or a server 306. Communication among such devices may include transfer of user information for the image capture device 302. The user information for the image capture device 302 may characterize subscription of a user of the image capture device 302 to a feature plan, usage of the image capture device 302 by a user, and/or characterize other information about the image capture device 302 and/or the user of the image capture device 302. The user information for the image capture device 302 may be utilized to determine which features of the image capture device 302 should be enabled. Communication among such devices may enable the feature (s) of the image capture device.

For example, one or more features of the image capture device 302 may be enabled based on account type of the user of the image capture device 302 and/or purchase of features by the user of the image capture device 302. For instance, the user may purchase/subscribe to an account type that includes usage of particular features of the image capture device. Information about user purchase/subscription to the account type may be stored in the mobile device 304 and/or the server 306. The image capture device 302 may communicate with the mobile device 304 and/or the server 306 to check (e.g., verify, confirm) the feature purchase/account type of the user. The image capture device 302 may enable the features of the image capture device 302 that are provided with the feature purchase/account type of the user.

For instance, based on the user of the image capture device 302 having a valid subscription to a particular account type, beta features and/or new features of the image capture device 302 may be enabled for use. For example, a user having a valid subscription to a particular account type may receive early access to beta features for the image capture device 302. A user having a valid subscription to a particular account type may receive firmware upgrade to the image capture device 302 that changes the features of the image capture device 302 (e.g., upgrade features of the image capture device 302 to features released with newer version of the image capture device 302, upgrade features of the image capture device 302 without change in hardware). A user having purchased particular features may receive access to use those features on the image capture device 302 (e.g., allow user to pick and choose features to be enabled without change in hardware).

In some implementations, a user may subscribe to one or more account types and/or may purchase one or more features for the image capture device 302 based on communication between the mobile device 304 and the server 306. For example, options to subscribe to one or more account types or to purchase one or more features may be provided through an application running on the mobile device 304. For instance, offers/advertisements for subscription/feature purchases may be communicated from the server 306 to the mobile device 304 for presentation on the display of the mobile device 304. A user may subscribe and/or purchase features via interaction with the mobile device 304, and features corresponding to the subscription/purchases may be enabled at the image capture device 302. Other communication and/or feature enablement of image capture device are contemplated.

In some implementations, the features enabled based on user information may be deactivated based on change to the user information. For example, based on expiration of the user's subscription to the particular account type, the features of the image capture device 302 associated with the account type may be disabled to prevent further use of those features with the image capture device 302.

Figure 4:
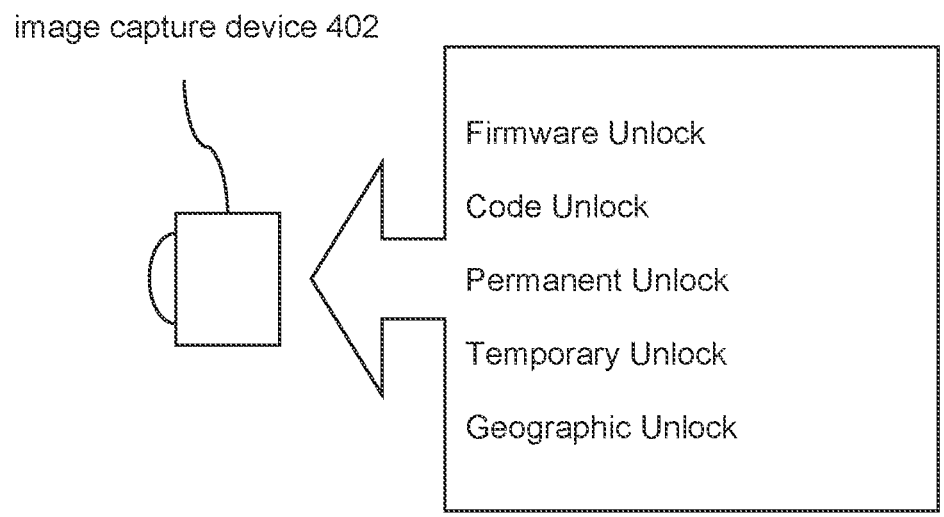
FIG. 4 illustrates example enablement of image capture features.

FIG. 4 illustrates example enablement of image capture features. One or more features of an image capture device 402 may be enabled through one or more unlock process. An unlock process may refer to a process by which one or more features of the image capture device 402 are enabled (e.g., unlocked for use). An unlock process may enables one or more features of the image capture device 402. An unlock process may enable feature(s) of the image capture device 402 via change or through the firmware of the image capture device 402.

For example, feature(s) of the image capture device 402 may be enabled through firmware unlock. Firmware unlock may enable changes to the firmware of the image capture device 402. For example, the firmware unlock may enable changes to the firmware of the image capture device 402 by utilizing firmware upgrade/change information stored in the image capture device 402. As another example, the firmware unlock may enable changes to the firmware of the image capture device 402 by allowing the image capture device 402 to download a particular firmware (e.g., newer/upgraded version of firmware) to replace its current firmware.

As another example, feature(s) of the image capture device 402 may be enabled through code unlock. Code unlock may enables feature(s) available through the existing firmware of the image capture device 402 to be utilized by the user. Code unlock may enable feature(s) of the image capture device 402 by permitting execution of certain processes and/or applications within the existing firmware of the image capture device 402. For example, the firmware of the image capture device 402 may include a set of features, with some of the features enabled and some of the features disabled. Code unlock may utilize one or more codes to enable one or more of the disabled features. For example, different codes may be associated with different features, and the code unlock may utilize particular code(s) to enable the corresponding feature(s).

An unlock process may enables feature(s) of the image capture device 402 with or without limitations. For example, an unlock process may enables feature(s) of the image capture device 402 with or without time restrictions (e.g., a feature being enabled for all time via permanent unlock versus for a limited amount of time via temporary unlock). Enabling feature(s) temporarily using temporary unlock may enable a user to test/try out the feature(s) for a duration of time. The feature(s) may be locked/disabled after the duration of time. An unlock process may enables feature(s) of the image capture device 402 with or without geographic restrictions (e.g., a feature being enabled regardless of location of the image capture device 302 versus for a limited geographic area via geographic unlock). Enabling feature(s) geographically using geographic unlock may enable a user to test/try out the feature(s) at one or more designated locations. The feature(s) may be locked/disabled when the image capture device 402 is removed from the designated location(s).

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate enabling image capture features. The machine-readable instructions 100 may include one or more computer program components. The machine-readable instructions 100 may include one or more of a user component 102, a feature determination component 104, a feature enablement component 106, and/or other computer program components.

The user component 102 may be configured to obtain user information for an image capture device and/or other information. Obtaining user information may include one or more of accessing, acquiring, analyzing, determining, examining, generating, identifying, loading, locating, opening, receiving, retrieving, reviewing, selecting, storing, and/or otherwise obtaining the user information. The user component 102 may obtain user information from one or more locations. For example, the user component 102 may obtain user information from a storage location, such as the electronic storage 13, electronic storage of a device accessible via a network, and/or other locations. The user component 102 may obtain user information from one or more hardware components (e.g., a computing device) and/or one or more software components (e.g., software running on a computing device).

The user information may refer to information relating to a user of an image capture device. The user information may include information relating to the user with respect to the image capture device for which feature(s) may be enabled. The user information may include information relating to the user respect to other image capture device(s).

In some implementations, the user information may characterize subscription of a user of the image capture device to one or more feature plans. A feature plan may refer to a plan that includes and/or is associated with one or more features of the image capture device. For example, a single feature plan may be offered, and the single feature plan may include and/or may be associated with particular feature(s) of the image capture device. As another example, multiple feature plans may be offered, and different feature plans may include and/or may be associated with different features of the image capture device (e.g., different feature plans for different sets of features, individual feature plans for individual features). Subscription of a user to a feature plan may refer to the user's arrangement with one or more entities (e.g., provider of the feature plan) to receive benefit of the feature plan.

In some implementations, subscription to a feature plan may cost an amount of money, and the user may pay the amount in a lump sum and/or in a periodic basis. In some implementations, subscription to a feature plan may require continual payment to continue the subscription. For example, subscription to a feature plan may include subscription to a monthly/yearly plan. In some implementations, subscription to a feature plan may require a single payment and the subscription may not lapse. For example, subscription to a feature plan may permanently unlocks feature(s) included in/associated with the feature plan.

The user information may characterize subscription of a user of the image capture device to feature plan(s) by including information that define one or more qualities, attributes, features, and/or other aspects of the subscription of the user of the image capture device to the feature plan(s). For example, the user information may characterize subscription of a user of the image capture device to feature plan(s) by including information specifies/describes/identifies the subscription of the user of the image capture device to the feature plan(s), information that is used to specify/describe/identify the subscription of the user of the image capture device to the feature plan(s), and/or other information that characterizes the subscription of the user of the image capture device to the feature plan(s).

In some implementations, the user information may characterize usage of an image capture device by a user. Usage of an image capture device by a user may refer to one or more actions of the user in using the image capture device. Usage of an image capture by a user may refer to how the user used the image capture device to capture content. For example, usage of an image capture by a user may include which features of the image capture device were used by the user, when the image capture device was used by the user (e.g., specific time, day/night, month, season), where the image capture device was used by the user (e.g., GPS data), environment in which the image capture device was used by the user (e.g., on the ground, on/under water, in the air, in urban environment, in dessert environment, in mountain environment, in forest environment, in beach environment), how the image capture device was moved during capture (e.g., IMU data, such as speed and/or acceleration), and/or other usage of the image capture device by the user. Usage of an image capture by a user may refer to content captured by the user using the image capture device. For example, usage of an image capture by a user may include visual content, audio content, and/or video content captured by the user using the image capture device. Usage of an image capture by a user may include type of content captured by the user using the image capture device. For example, usage of an image capture by a user may include type of subject, scene, emotion, activity, event, and/or other content captured by the user using the image capture device. In some implementations, usage of an image capture device by a user may be determined based on image capture device setting(s) used to capture content, keystroke history on the image capture device, metadata collected by the image capture device before, during, and/or after capture of content, and/or other information.

The user information may characterize usage of an image capture device by a user by including information that define one or more qualities, attributes, features, and/or other aspects of the usage of the image capture device by the user. For example, the user information may characterize usage of an image capture device by a user by including information specifies/describes/identifies the usage of the image capture device by the user, information that is used to specify/describe/identify the usage of the image capture device by the user, and/or other information that characterizes the usage of the image capture device by the user.

The feature determination component 104 may be configured to determine one or more features to be enabled for the image capture device based on the user information and/or other information. Determining a features to be enabled for the image capture device may include ascertaining, establishing, finding, identifying, selecting, setting, and/or otherwise determining the features to be enabled for the image capture device. The feature determination component 104 may be configured to determine one or more features to be enabled for the image capture device based on the subscription of the user of the image capture device to one or more feature plans. For example, the feature included in and/or associated with the feature plan(s) to which the user has a subscription may be determined by the feature determination component 104 to be enabled for the image capture device. The feature determination component 104 may be configured to determine one or more features to be enabled for the image capture device based on usage of one or more image capture devices by the user of the image capture device. For example, the feature determination component 104 may be configured to determine one or more features to be enabled for the image capture device based on how the user used the image capture device and/or how the user used other image capture devices.

In some implementations, the feature(s) to be enabled for the image capture device may include one or more beta features. A beta feature may refer to a feature of the image capture device that is currently in testing mode/not yet finalized. For example, based on a user having purchase a beta feature and/or having subscription to a feature plan including/associated with the beta feature, the feature determination component 104 may determine the beta feature to be enabled for the image capture device. Enabling the beta feature on the image capture devices of users having purchased the beta feature and/or having subscription to the feature plan including/associated with the beta feature may allow such users to try out/test the beta feature ahead of other users (e.g., provide sneak peak of features months ahead of other users).

In some implementations, the feature(s) to be enabled for the image capture device may include one or more upgrade features. An upgrade feature may refer to a feature of the image capture device that may be improved via software/firmware changes. For example, based on a user having purchase an upgrade feature and/or having subscription to a feature plan including/associated with the upgrade feature, the feature determination component 104 may determine the upgrade feature to be enabled for the image capture device. Enabling the upgrade feature on the image capture devices of users having purchased the upgrade feature and/or having subscription to the feature plan including/associated with the upgrade feature may allow such users to upgrade (e.g., via software/firmware update) their image capture device without making changes to the hardware of the image capture device. Such improvement of the image capture device may enable such users to enjoy the benefit of improvements to the features of the image capture device without purchasing a different image capture device. For example, rather than purchasing a newer version of the image capture device having the upgraded features, the users may purchase the software/firmware upgrade their older version(s) of the image capture device to use those upgraded features on the older version(s) of the image capture device.

In some implementations, the feature(s) to be enabled for the image capture device may include one or more enhancement features. An enhancement feature may refer to feature of the image capture device that may improve functionality of the image capture device. An enhancement feature may not be required for the core functions (e.g., basic capture of images, videos, audio) of the image capture device, but rather may include optional features of the image capture device. For example, based on a user having purchase an enhancement feature and/or having subscription to a feature plan including/associated with the enhancement feature, the feature determination component 104 may determine the enhancement feature to be enabled for the image capture device. Enabling the enhancement feature on the image capture devices of users having purchased the enhancement feature and/or having subscription to the feature plan including/associated with the enhancement feature may allow such users to utilize optional features of the image capture device (e.g., have access to features not available to default configuration of the image capture device).

In some implementations, the feature(s) to be enabled for the image capture device may include one or more off-camera features. An off-camera feature may refer to feature of the image capture device that relies on operation of other computing device(s). An off-camera feature may utilize the operation of the other computing device(s) in conjunction with or separately from the operation of the image capture device. For example, an off-camera feature may include a feature that is provided by an application running on a mobile device (e.g., the mobile device 304) and/or a server (e.g., the server 306). For instance, the mobile device and/or the server may provide processing resource to perform computation that is not performed by the image capture device, and which may enhance the operation of the image capture device. Enabling the off-camera feature on the image capture devices of users having purchased the off-camera feature and/or having subscription to the feature plan including/associated with the off-camera feature may allow such users to utilize the off-camera feature of the image capture device to improve operation of the image capture device (e.g., utilize resources of the mobile device and/or the server to improve capture/processing of images, videos, audio).

In some implementations, the feature(s) to be enabled for the image capture device may be determined based on whether or not the user of the image capture device has a current subscription to one or more feature plans. A user may have a current subscription to a feature plan based on the user having a subscription that has not expired. A user may have a current subscription to a feature plan based on the user being current on periodic payment for the feature plan (e.g., update to date on monthly payment to keep a subscription account alive) and/or based on the user having purchased a permanent subscription to the feature plan (e.g., user made a single purchase of a particular feature). A feature plan may include and/or may be associated with one or more features. Based on the user of the image capture device having a current subscription to a feature plan, the features included in and/or associated with the feature plan may be determined by the feature determination component 104 to be enabled for the image capture device.

In some implementations, the feature(s) to be enabled for the image capture device may be determined based the usage of the image capture device and/or other image capture device(s) by the user. For example, the feature determination component 104 may be configured to determine one or more features to be enabled for the image capture device based on one or more actions of the user in using image capture device(s), how the user used image capture device(s) to capture content, which features of image capture device(s) were used by the user, when image capture device(s) were used by the user, and/or where image capture device(s) were used by the user. The feature determination component 104 may be configured to determine one or more features to be enabled for the image capture device based on content captured by the user using image capture device(s), such as based on visual content, audio content, and/or video content captured by the user using image capture device(s). The feature determination component 104 may determine different features to be enabled for the image capture device based on different usage of image capture device(s) by the user.

For example, the feature determination component 104 may determine, based on the user's usage of image capture device(s), that the user frequently captures a certain type of activity using image capture device(s) and/or that the user frequently uses a certain setting to capture content. The feature determination component 104 may determine, as features to be enabled, the features that compliment and/or improve upon the capture of the certain type of activity and/or the setting used by the user. For example, the feature determination component 104 may determine image enhancement features to be enabled for the image capture device based on the user's usage indicating that the user uses image capture device(s) to capture static images/videos (images/videos captured while the image capture device(s) are still), while the feature determination component 104 may determine video stabilization features to be enabled for the image capture device based on the user's usage indicating that the user uses image capture device(s) to capture dynamic videos (images/videos captured while the image capture device(s) are moving).

In some implementations, the feature determination component 104 may classify users into different groups/classifications based on the user information, and the features to be enabled for the image capture device may be determined based on the classification of the user of the image capture device. Different groups/classifications of the users may be associated with different features, and feature(s) corresponding to the group(s)/classification(s) of the user may be determined by the feature determination component 104 to be enabled for the image capture device. For example, users may be classified into different groups/classifications based on how they used image capture devices to capture content. As another example, users may be classified into different groups/classifications based on whether or not/how often the users upgraded their image capture device (e.g., with software update, with hardware update, through subscription of feature plans).

For example, the user of the image capture device may be classified as an advanced user or a basic user based on the usage of the image capture device by the user and/or other information. A basic user may refer to a user that uses basic features of the image capture device to capture content. A basic feature may refer to a feature of the image capture device that is able to be used with minimal or no configuration by a user. For example, basic features of the image capture device may include standard capture features (e.g., capturing images, recording videos), standard settings (e.g., default presets of camera settings, default video stabilization), and/or other basic features.

An advanced user may refer to a user that uses advanced features of the image capture device to capture content. An advanced feature may refer to a feature of the image capture device that is able to be used with configuration by a user. For instance, an advanced feature may refer to a feature of the image capture device that requires a user to choose among different option to set the feature. For example, advanced features of the image capture device may include customizable capture features (e.g., scheduled recording, time-lapse mode), customized settings (e.g., custom camera settings, customized video stabilization), and/or other advanced features. A user that uses advanced features may be more receptive to trying out new features on the image capture device.

In some implementations, responsive to classification of the user as an advanced user, the feature(s) for the image capture device may be offered to the user. Offering a feature for the image capture device to a user may include providing an option to the user to use the feature for the image capture device. In some implementations, offering a feature for the image capture device to a user may include offering to enable the feature for the image capture device in return for monetary payment. In some implementations, an offer for a feature for the image capture device may include a preview of the feature for the image capture device, such as a preview of what content captured using the feature may look like or allowing the feature to be used for a limited time.

Responsive to classification of the user as a basic user, usage of one or more advanced features may be recommended to the user. The advanced feature(s) recommended to the user may already be enabled for the image capture device. That is, responsive to a user being classified as a basic user, the user may be recommended to utilize one or more advanced features existing on the image capture device. Use of advanced features by the user may make the user more receptive to trying out new/other features on the image capture device. Usage of the advanced feature(s) by the user may change the classification of the user from the basic user to the advanced user. That is, the basic user may be recommended to use advanced features that will change the user from being a basic user to an advanced user. Such recommendation of advanced features may enable a basic user to gain more experience with advanced features of the image capture device and turn the user into the type of users who may be more receptive to trying out new features on the image capture device. Other classification of users and other features for different classification of users are contemplated.

Figure 5:
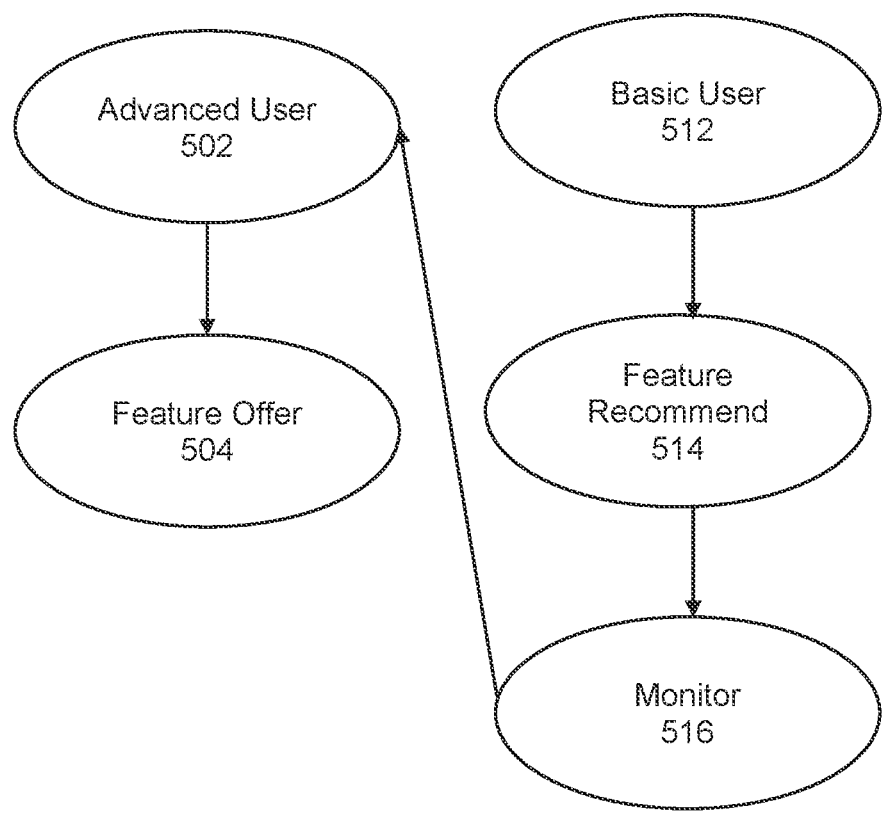
FIG. 5 illustrates example user classification for enabling image capture features.

FIG. 5 illustrates example user classification for enabling image capture features. A user may be classified as an advanced user 502 or a basic user 512 based on usage of image capture device(s) by the user. Based on the user being classified as an advanced user 502, feature offer 504 (for one or more features) may made to the user. Based on the user being classified as a basic user 512, feature recommend 512 (for one or more advanced features) may be made to the user. Usage of the advanced features by the user may be monitored 516, and based on the user adequately using the advanced features (e.g., using the advanced features a threshold number of times, using a threshold number of advanced features), the user classification may be changed to an advanced user 502.

The feature enablement component 106 may be configured to enable the feature(s) for the image capture device. Enabling a feature for the image capture device may include activating the feature on the image capture device, making the feature available on the image capture device, turning on the feature on the image capture device, and/or otherwise enabling the feature for the image capture device. A feature for the image capture device may be enabled permanently or temporarily. For example, the feature(s) for the image capture device may be enabled for a limited amount of time. After the passage of the limited amount of time, the feature(s) may automatically be disabled. In some implementations, the feature(s) for the image capture device may be enabled without a time constraint. That is, the feature(s) may continue to be enabled for the image capture device regardless of how much time passes.

In some implementations, the feature(s) for the image capture device may be enabled based on user acceptance of the offer of the feature(s) for the image capture device. For example, the feature(s) for the image capture device may be offered to the user in return for monetary payment. Based on the user accepting the offer, the feature(s) for the image capture device may be enabled. Based on user rejecting the offer, the feature(s) for the image capture device may not be enabled.

In some implementations, the feature(s) for the image capture device may be enabled through firmware update. Different firmware may include different features for the image capture device, and the feature(s) for the image capture device may be enabled by providing the corresponding firmware for installation on the image capture device. The firmware may be pushed to the image capture device and/or made available for download to the image capture device.

In some implementations, the firmware update that enables the feature(s) for the image capture device may be provided to the image capture device based on the user of the image capture device having current subscription to corresponding feature plan(s). Firmware update may be allowed on image capture devices that are registered to users who having a valid subscription to the feature plan(s). The firmware update that enables the feature(s) for the image capture device may not be provided to the image capture device based on the user of the image capture device not having the current subscription to the feature plan(s). Firmware update may not be allowed (e.g., not allow firmware download; not allow installation of firmware) on image capture devices that are registered to users who do not have a valid subscription to the feature plans(s).

In some implementations, responsive cancellation of the subscription of the user of the image capture device to the feature plan(s), the feature(s) for the image capture device may be disabled through firmware downgrade. For example, based on lapse of the user subscription (e.g., through non-payment of periodic fees, through cancellation), the firmware of the image capture device registered to the user may be changed to a different firmware so that the feature(s) for the image capture device are disabled. The different firmware may be pushed to the image capture device and/or made available for download to the image capture device. In some implementations, the user may be provided with a limited number of uses of the image capture device and/or a limited duration of time in which the different firmware may be installed on the image capture device. During these limited uses, the firmware of the image capture device may not be changed, and the feature(s) may continue to be enabled. Based on the use of the image capture device exceeding the limited number of uses/limited duration of time, the image capture device may be locked/prevented from further use until the different firmware is installed.

In some implementations, the feature(s) for the image capture device may be enabled through one or more feature unlock options in firmware of the image capture device. A feature unlock option may allow one or more particular features to be enabled for the image capture device. A feature unlock option may enable usage of features that are locked but present in the firmware. For example, a feature unlock option may permit execution of certain processes and/or applications within the existing firmware of the image capture device and allow the corresponding feature(s) to be used on the image capture device.

In some implementations, the feature(s) for the image capture device may be disabled through one or more feature lock options in firmware of the image capture device. A feature lock option may allow one or more particular features to be disabled for the image capture device. A feature lock option may disable usage of features that are present in the firmware. For example, a feature lock option may prevent execution of certain processes and/or applications within the existing firmware of the image capture device and prevent the corresponding feature(s) from being used on the image capture device.

In some implementations, preview of one or more features not enabled for the image capture device may be provided to a user of the image capture device. A preview of a feature may refer to demonstration of the feature. A preview of a feature may refer to a limited usage of the feature. For example, a preview of a feature may include processing of a video captured on the image capture device to show how that video would look had the feature been used to capture the video. A preview of a feature may include processing of a portion of a video (e.g., first 10 seconds) captured on the image capture device to show how that portion of the video would look had the feature been used to capture the video For instance, to provide a preview of an advanced video stabilization feature, a video captured by the image capture device may be stabilized using the advanced video stabilization feature and the result may be provided to the user. As another example, a preview of a feature may include the feature being enabled for a short time to allow the user the chance to test out the feature.

In some implementations, preview of the feature(s) may be provided based on user's usage of the image capture device. For example, preview of a video stabilization feature may be offered when a user is using the image capture device while performing a dynamic activity. For instance, based on the user participating in a mountain biking ride, the preview of the video stabilization feature may be offered to allow the user to try out the video stabilization feature for the mountain biking ride. The preview of the video stabilization feature may end at the end of the mountain biking ride.

In some implementations, preview of the feature(s) may be provided on a periodic basis. For example, preview of the feature(s) may be provided on certain days or based on frequency of use of the image capture device (e.g., a preview provided every 3rd time the image capture device is used). Other provisions of preview of features are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. For example, one or more computer program component may be located within processing unit(s) of an image capture device and one or more computer program component may be located within processing unit(s) of a computing device.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
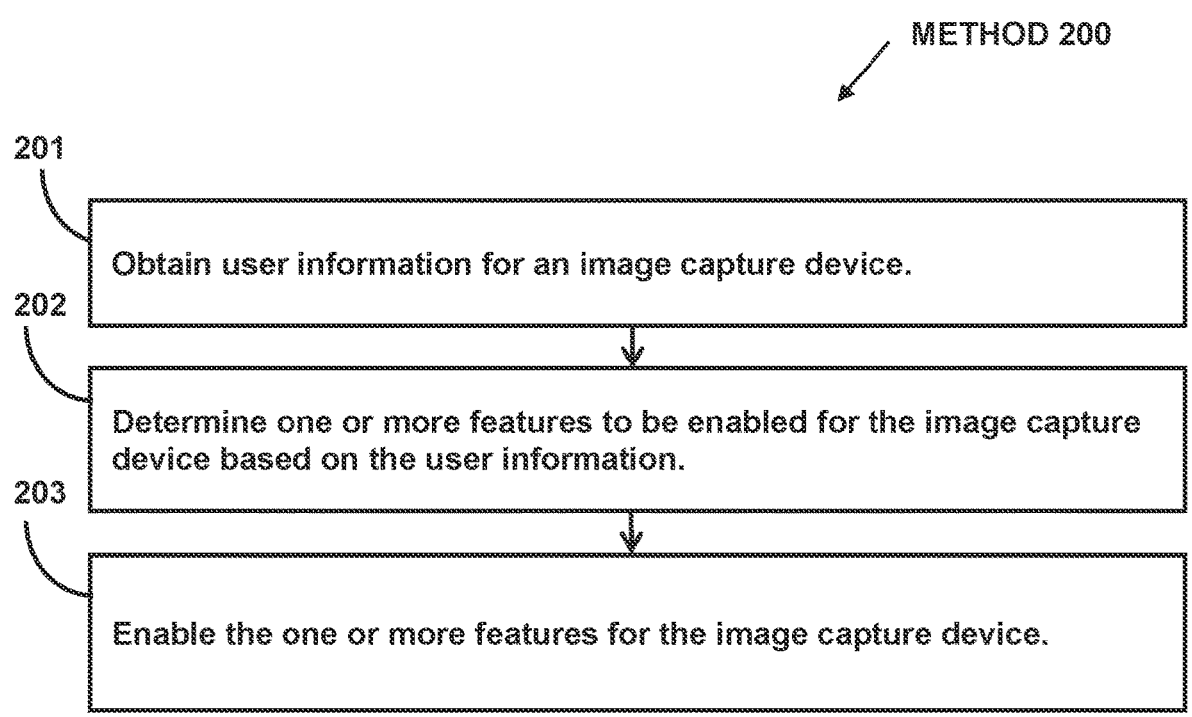
FIG. 2 illustrates an example method for enabling image capture features.

FIG. 2 illustrates method 200 for enabling image capture features. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, user information for an image capture device and/or other information may be obtained. In some implementations, operation 201 may be performed by a processor component the same as or similar to the user component 102 (Shown in FIG. 1 and described herein).

At operation 202, one or more features to be enabled for the image capture device may be determined based on the user information and/or other information. In some implementations, operation 202 may be performed by a processor component the same as or similar to the feature determination component 104 (Shown in FIG. 1 and described herein).

At operation 203, the feature(s) for the image capture device may be enabled. In some implementations, operation 203 may be performed by a processor component the same as or similar to the feature enablement component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for enabling image capture features, the system comprising:
   one or more physical processors configured by machine-readable instructions to:
   obtain user information for an image capture device, the user information characterizing usage of the image capture device by a user and subscription of the user to a feature plan;
   determine one or more features to be enabled for the image capture device based on the usage of the image capture device by the user; and
   enable the one or more features for the image capture device based on the subscription of the user to the feature plan.

2. The system of claim 1, wherein the one or more features for the image capture device are enabled through firmware update or a feature unlock option in firmware of the image capture device.

3. The system of claim 2, wherein the one or more features to be enabled for the image capture device are determined further based on the subscription of the user to the feature plan.

4. The system of claim 2, wherein the enablement of the one or more features for the image capture device based on the subscription of the user to the feature plan includes:
   the firmware update that enables the one or more features for the image capture device being provided to the image capture device based on the user of the image capture device having a current subscription to the feature plan; and
   the firmware update that enables the one or more features for the image capture device not being provided to the image capture device based on the user of the image capture device not having the current subscription to the feature plan.

5. The system of claim 4, wherein responsive cancellation of the subscription of the user of the image capture device to the feature plan, the one or more features for the image capture device are disabled through firmware downgrade.

6. The system of claim 1, wherein the usage of the image capture device by the user includes which features of the image capture device were used by the user to capture content.

7. The system of claim 1, wherein the one or more features include a beta feature, an upgrade feature, an enhancement feature, and/or an off-camera feature.

8. The system of claim 1, wherein the one or more physical processors are further configured by the machine-readable instructions to provide preview of one or more features not enabled for the image capture device to the user of the image capture device, preview of a given feature including demonstration of the given feature or a limited usage of the given feature.

9. The system of claim 8, wherein the preview of the one or more features not enabled for the image capture device is provided based on the usage of the image capture device by the user.

10. A method for enabling image capture features, the method performed by a computing system including one or more processors, the method comprising:
    obtaining, by the computing system, user information for an image capture device, the user information characterizing usage of the image capture device by a user and subscription of the user to a feature plan;
    determining, by the computing system, one or more features to be enabled for the image capture device based on the usage of the image capture device by the user; and
    enabling, by the computing system, the one or more features for the image capture device based on the subscription of the user to the feature plan.

11. The method of claim 10, wherein the one or more features for the image capture device are enabled through firmware update or a feature unlock option in firmware of the image capture device.

12. The method of claim 11, wherein the one or more features to be enabled for the image capture device are determined further based on the subscription of the user to the feature plan.

13. The method of claim 11, wherein the enablement of the one or more features for the image capture device based on the subscription of the user to the feature plan includes:
    the firmware update that enables the one or more features for the image capture device being provided to the image capture device based on the user of the image capture device having a current subscription to the feature plan; and
    the firmware update that enables the one or more features for the image capture device not being provided to the image capture device based on the user of the image capture device not having the current subscription to the feature plan.

14. The method of claim 13, wherein responsive cancellation of the subscription of the user of the image capture device to the feature plan, the one or more features for the image capture device are disabled through firmware downgrade.

15. The method of claim 10, wherein the usage of the image capture device by the user includes which features of the image capture device were used by the user to capture content.

16. The method of claim 10, wherein the one or more features include a beta feature, an upgrade feature, an enhancement feature, and/or an off-camera feature.

17. The method of claim 10, further comprising providing preview of one or more features not enabled for the image capture device to the user of the image capture device, preview of a given feature including demonstration of the given feature or a limited usage of the given feature.

18. The method of claim 17, wherein the preview of the one or more features not enabled for the image capture device is provided based on the usage of the image capture device by the user.

19. A system for enabling image capture features, the system comprising:
    one or more physical processors configured by machine-readable instructions to:
    obtain user information for an image capture device, the user information characterizing usage of the image capture device by a user and subscription of the user to a feature plan;

determine one or more features to be enabled for the image capture device based on the usage of the image capture device by the user; and enable the one or more features for the image capture device based on the subscription of the user to the feature plan, wherein the one or more features for the image capture device are enabled through firmware update and/or a feature unlock option in firmware of the image capture device.

20. The system of claim 19, wherein the one or more features include a beta feature, an upgrade feature, an enhancement feature, and/or an off-camera feature.

\* \* \* \* \*